US012613921B2

(12) United States Patent (10) Patent No.: US 12,613,921 B2

Nefedov et al. (45) **Date of Patent: \*Apr. 28, 2026**

(54) HIERARCHICAL CLUSTERING ON GRAPHS FOR TAXONOMY EXTRACTION AND APPLICATIONS THEREOF

(71) Applicant: Thomson Reuters Enterprise Centre GmbH, Zug (CH)

(72) Inventors: Nikolai Nefedov, Obfelden (CH); David von Rickenbach, Baar (CH)

(73) Assignee: Thomson Reuters Enterprise Centre, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,903

(22) Filed: Jan. 30, 2024

(65) Prior Publication Data

US 2024/0168999 A1 May 23, 2024

Related U.S. Application Data

(63) Continuation of application No. 17/901,648, filed on Sep. 1, 2022, now Pat. No. 11,886,515.

(60) Provisional application No. 63/240,393, filed on Sep. 3, 2021.

(51) Int. Cl.
*G06F 16/906* (2019.01)
*G06F 16/901* (2019.01)
*G06F 16/93* (2019.01)

(52) U.S. Cl.
CPC ........ *G06F 16/906* (2019.01); *G06F 16/9024* (2019.01); *G06F 16/93* (2019.01)

(58) Field of Classification Search
CPC ..... G06F 16/906; G06F 16/9024; G06F 16/93

USPC ....... 707/708, 711, 724, 728, 737, 739, 741, 707/748, 749, 753, 801, 17.009, 17.01, 707/17.014, 17.046, 17.089
See application file for complete search history.

(56) References Cited

U.S. PATENT DOCUMENTS

| | | | | |
|---|---|---|---|---|
| 8,805,845 | B1 * | 8/2014 | Li ....................... | G06F 16/9024 707/738 |
| 9,715,495 | B1 * | 7/2017 | Tacchi ................... | G06F 40/30 |
| 11,748,214 | B2 | 9/2023 | Agrawal et al. | |
| 2010/0082511 | A1 * | 4/2010 | Niu ....................... | G06F 16/334 707/E17.014 |
| 2016/0212163 | A1 * | 7/2016 | Louni ................. | H04L 63/1408 |
| 2017/0214589 | A1 * | 7/2017 | Conover ............... | G06Q 50/01 |

(Continued)

OTHER PUBLICATIONS

Patent Cooperation Treaty, International Search Report and Written Opinion issued for PCT Application No. PCT/IB2022/058284, dated Dec. 20, 2022, 13 pages.

(Continued)

*Primary Examiner* — Md I Uddin

(74) *Attorney, Agent, or Firm* — Norton Rose Fulbright US LLP

(57) ABSTRACT

Aspects of the present disclosure provide systems, methods, apparatus, and computer-readable storage media for extracting taxonomies based on hierarchical clustering on graphs related to a corpus of documents and using said taxonomies for classifying and labeling documents. The hierarchical clustering of graphs include the adaptive pruning of nodes at each hierarchy based on betweenness centrality of nodes to form clusters that have modularity score exceeding a minimum modularity threshold.

17 Claims, 10 Drawing Sheets

(56)     References Cited

U.S. PATENT DOCUMENTS

| | | |
|---|---|---|
| 2019/0220695 A1 | 7/2019 | Nefedov |
| 2020/0219005 A1* | 7/2020 | Valdez .................. G06N 20/20 |
| 2021/0141822 A1 | 5/2021 | McLeod |

OTHER PUBLICATIONS

Fortunato, Santo "Community Detection in Graphs," Physics Reports, Feb. 2010; 486(3-5): 75-174, 103 pages.

* cited by examiner

200

DATA SOURCES

170

Receive Corpus of Documents — 210

Construct Similarity or Features Co-occurrence Matrix — 220

Generation of Graph based on the Similarity or Features Matrix — 230

Community Detection — 240

Adaptive Pruning of Graphs to Extract Taxonomy — 250

Input Document — 270

Input Document Labeling and Classification — 280

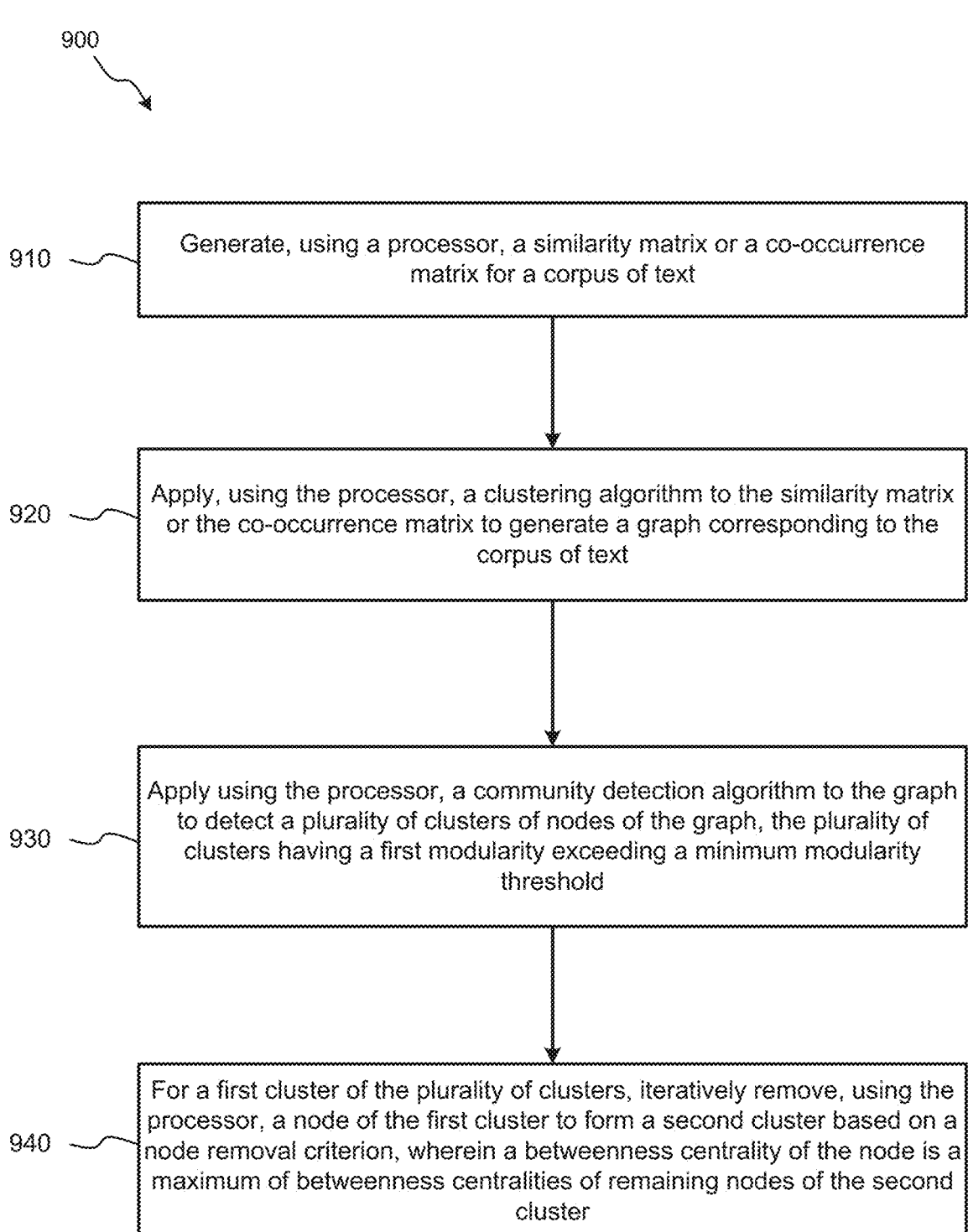

900

910 — Generate, using a processor, a similarity matrix or a co-occurrence matrix for a corpus of text 920 — Apply, using the processor, a clustering algorithm to the similarity matrix or the co-occurrence matrix to generate a graph corresponding to the corpus of text 930 — Apply using the processor, a community detection algorithm to the graph to detect a plurality of clusters of nodes of the graph, the plurality of clusters having a first modularity exceeding a minimum modularity threshold 940 — For a first cluster of the plurality of clusters, iteratively remove, using the processor, a node of the first cluster to form a second cluster based on a node removal criterion, wherein a betweenness centrality of the node is a maximum of betweenness centralities of remaining nodes of the second cluster

*FIG. 9*

HIERARCHICAL CLUSTERING ON GRAPHS FOR TAXONOMY EXTRACTION AND APPLICATIONS THEREOF

CROSS-REFERENCE TO RELATED APPLICATIONS

The present application is a continuation of U.S. patent application Ser. No. 17/901,648 filed Sep. 1, 2022, and entitled "Hierarchical Clustering on Graphs for Taxonomy Extraction and Applications Thereof," which claims the benefit of priority from U.S. Provisional Patent Application No. 63/240,393 filed Sep. 3, 2021, and entitled "Hierarchical Clustering on Graphs Unsupervised Taxonomy Extraction and Its Applications," the disclosures of which are incorporated by reference herein in their entirety.

TECHNICAL FIELD

The present disclosure relates generally to the analysis of a corpus of documents to extract taxonomies and the usage of the extracted taxonomies for document classification and, more particularly, to performing unsupervised hierarchical clustering on graphs that correspond to the corpus of documents to extract taxonomies which can then be used to classify and label documents.

BACKGROUND

The advent of modern computer systems have ushered in an age of massive information generation on an essentially continuous basis. This is true in almost all human endeavors where the amount of information that is available today, and continues to be generated daily, defies any manual attempt at categorizing the information. Accordingly, content and enhanced experience providers such as the Thomson Reuters Corporation have developed and deployed automated systems that utilize artificial intelligence/machine learning models to accomplish such purposes. For example, machine learning models with natural language processing capabilities have been used to process and classify a massive number of documents in various domains, such as but not limited to legal, scientific, financial, etc., domains.

Documents can be classified according to classification schemes or taxonomies, which can be very beneficial because the taxonomies allow users to efficiently interact with the documents, be it when storing, searching, retrieving, disposing, etc., of the documents. Taxonomies can be constructed using clustering algorithms that are designed to discover groupings in a set of objects. For example, hierarchical clustering algorithms can group objects like documents into clusters that have tree-like orders, i.e., the objects/documents are grouped into a tree of clusters. There are two types of hierarchical clustering algorithms, "bottom-up" and "top-down". Bottom-up clustering algorithms initially consider each document as a single cluster and successively merge or agglomerate pairs of clusters into a single cluster until all documents are grouped into a single final cluster. Conversely, top-down clustering algorithms start with all documents considered as belonging to a single cluster, and successively split each cluster until a cluster holds a single document.

SUMMARY

Aspects of the present disclosure provide systems, methods, apparatus, and computer-readable storage media for extracting taxonomies based on hierarchical clustering on graphs related to a corpus of documents and using said taxonomies for classifying documents. In various aspects, the methods comprise generating a similarity matrix among documents or/and a co-occurrence matrix of documents' features for a corpus of documents. Examples of documents' features may include single or multiple words, phrases, their mapping (embeddings) into multi-dimensional space, etc. Further, the methods comprise applying a clustering algorithm to the similarity matrix among documents or the co-occurrence matrix to generate a graph corresponding to the corpus of documents. In addition, the methods comprise applying a community detection algorithm to the graph to detect a plurality of clusters of nodes of the graph at each of hierarchical levels such that, the graph-modularity of plurality of clusters exceeds a minimum modularity threshold at each hierarchical level, respectively. To meet the requirement of a minimum modularity threshold at given hierarchical level, the methods further comprise, for a first cluster of the plurality of clusters, iteratively removing a node of the first cluster to transform the first cluster into a second (e.g., updated) cluster based on a pruning stop criterion, wherein the removed node has an associated betweenness centrality score that is a maximum of the betweenness centralities of the remaining nodes of the second cluster. In some instance, the pruning occurs when the modularity for a given cluster is below the modularity threshold.

In various aspects, the system for extracting taxonomies based on hierarchical clustering on graphs related to a corpus of documents and using said taxonomies for classifying documents comprise a processor, and a memory device coupled to the processor and including instructions that, when executed by the processor, configure the processor to perform operations comprising generating a similarity matrix or a co-occurrence matrix for a corpus of documents. Further, the operations comprise applying a clustering algorithm to the similarity matrix or the co-occurrence matrix and generating a graph corresponding to the corpus of documents. In addition, the operations comprise applying a community detection algorithm to the graph constructed from matrices above to detect a plurality of clusters of nodes of the graph at different hierarchical levels, such that each cluster of the plurality of clusters at all hierarchical level has a modularity exceeding a minimum modularity threshold, respectively. The operations further comprise, for a first cluster of the plurality of clusters, iteratively removing a node of the first cluster to transform the first cluster into a second (e.g., updated) cluster based on a pruning stop criterion, wherein the removed node has an associated betweenness centrality score that is a maximum of the betweenness centralities of the remaining nodes of the second cluster. In some instance, the pruning occurs when the modularity for a given cluster is below the modularity threshold. The hierarchical clustering process (complimented with the adaptive pruning above) continues to the next (lower) hierarchical level until a minimum modularity threshold is satisfied.

In various aspects, the non-transitory computer-readable medium (CRM) for extracting taxonomies based on hierarchical clustering on graphs related to a corpus of documents and using said taxonomies for classifying documents stores therein a program for causing a computer to perform operations comprising generating a similarity matrix or a co-occurrence matrix for a corpus of documents. Further, the operations comprise applying a clustering algorithm to the similarity matrix or the co-occurrence matrix to generate a graph corresponding to the corpus of documents. In addition, the operations comprise applying a community detection algorithm to the graph to detect a plurality of clusters of nodes of the graph at different hierarchical levels, the plurality of clusters having a first modularity exceeding a minimum modularity threshold, respectively. The operations further comprise, for a first cluster of the plurality of clusters, iteratively removing a node of the first cluster to transform the first cluster into a second cluster based on a pruning stop criterion, wherein the removed node has an associated betweenness centrality score that is a maximum of the betweenness centralities of the remaining nodes of the second cluster. In some instance, the pruning occurs when the modularity for a given cluster is below the modularity threshold.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 9 is a flow diagram illustrating hierarchical clustering on graphs related to a corpus of documents according to one or more aspects.

4

Figure 1:
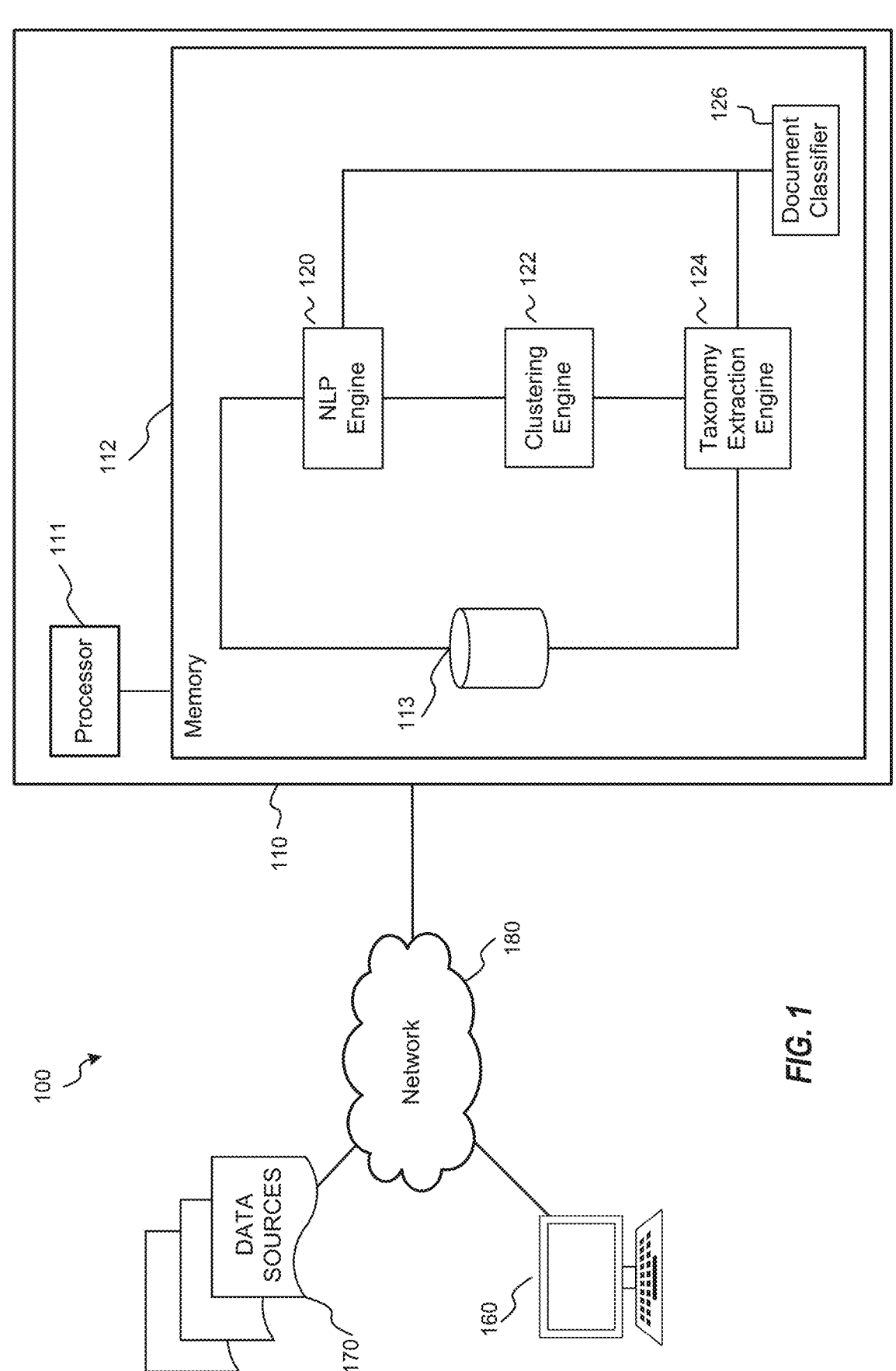
FIG. 1 is a block diagram of an example of a system that supports extracting taxonomies based on hierarchical clustering on graphs related to a corpus of documents and using said taxonomies for classifying documents according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Various features and advantageous details are explained more fully with reference to the non-limiting aspects that are illustrated in the accompanying drawings and detailed in the following description. Descriptions of well-known starting materials, processing techniques, components, and equipment are omitted so as not to unnecessarily obscure the aspects of the disclosure in detail. It should be understood, however, that the detailed description and the specific examples, while indicating various implementations, are given by way of illustration only, and not by way of limitation. Various substitutions, modifications, additions, and/or rearrangements within the scope of the disclosure will become apparent to those skilled in the art from this disclosure.

In many industries, massive amounts of documents are generated on a daily basis, and the fast processing, labeling and organizing of these documents are important to those that wish to access the information contained therein for decision making purposes (e.g., legal, commercial, or other purposes). For example, a large number of legal documents are generated in the United States alone on a daily basis, and it is important for service providers that offer services providing access to those documents to be able to label the documents as quickly as possible so that the documents can be made available for access via the services. Human annotations in general are not suitable, as they can be rather laborious, time-consuming, and very costly, in particular when the annotations are performed by subject matter experts. Even when automated, the labeling efforts can be too slow for real-time applications that may require the processing and labeling of thousands or even millions of documents in very short time. Further, some document labeling and classification-related applications can have high computing resource-requirements such as specific types of processors or large memory that may not be readily available, such as applications hosted in a cloud.

Aspects of the present disclosure disclose methods, systems and media that are configured to facilitate unsupervised or semi-supervised classification and labeling of documents with the use of taxonomies that are based on hierarchical clustering on graphs that are related to the documents. The disclosed techniques have lowered the complexity of the computations that are to be executed for labeling and classifying documents (e.g., linear in terms of the number of documents), compared to conventional classification algorithms, and as such can be scalable. For example, using the disclosed techniques enables millions of documents can be processed and labeled as discussed herein in real time (e.g., at a rate of about forty thousand documents per minute). At least because the burden on computation resources for labeling and classifying documents is significantly reduced due to the disclosed techniques, such specific improvements over prior systems result in improved and efficient classification of documents, presentation of knowledge, browsing and retrieval of documents, etc. Further, the improvements reduce the need for human annotation efforts, reduce cost, and further assist labeling efforts of subject matter experts. Moreover, due to the rapid labelling and classification capabilities provided by embodiments of the present disclosure, systems utilized to store and provide access to the documents may be enabled to more rapidly distribute documents more quickly, such as by enabling documents to become searchable (e.g., based on the applied labels and classifications).

Referring to FIG. 1, an example of a system configured for extracting taxonomies based on hierarchical clustering on graphs that are related to a corpus of documents, and using said taxonomies for classifying documents is shown as system 100, according to one or more aspects. As shown in FIG. 1, system 100 includes server 110, at least one user terminal 160, at least one data source 170, and network 180. These components, and their individual components, may cooperatively operate to provide functionality in accordance with the discussion herein. For example, in operation according to one or more implementations, data (e.g., corpus of documents) may be obtained from data sources 170 and may be provided as input to server 110. The various components of server 110 may cooperatively operate to perform the extraction of taxonomies for the corpus of documents and utilize said taxonomies for labeling and classification of said documents. For example, the various components of server 110 may cooperatively operate to process (e.g., by performing natural language processing (NLP)) the corpus of documents to extract features (e.g., keywords). Further, in some instances, similarity matrices may be constructed based on the features and the matrices can be presented as a graph or tree structure, where the nodes and the edges of the graphs represent the documents and the similarities between the documents, respectively.

In some instances, co-occurrence matrices for a corpus of documents may be constructed based on similarity among features of the documents that are extracted from the corpus of documents, such as the co-occurrence of words taken from the whole vocabulary over a corpus of documents. For example, given a corpus of documents with a vocabulary $V=\{ w_0, w_1, \ldots, w_N\}$, a co-occurrence matrix $C=\{cij\}$ contains of numbers of co-occurrent elements $cij=number\{wi,wj\}$. These co-occurrent elements may be seen as dominated "phrases" over all documents. The matrix C may be presented as a graph with nodes=$\{ w_0, w_1, \ldots, w_N\}$ formed by the vocabulary V and linked with words co-occurrence cij. That is, the nodes may represent the words in the corpus of vocabulary and the edges connecting nodes may represent the co-occurrences between the words represented by the connected nodes. Then clustering of the co-occurrence matrix would reveal dominated (and possibly hierarchical) clusters or "topics" over all documents. These "topics" may be used as "labels" for hierarchical clusters of documents described above.

The various components of server 110 may also cooperatively operate to extract taxonomies for the documents from the graph. For instance, the graph may be hierarchically clustered to form clusters of nodes at different hierarchical levels, for example, by adaptively pruning the graph at each hierarchy until the graph becomes a network of recognizable or identifiable clusters, and repeating the same procedure for each of the clusters until pruning is no longer possible or acceptable (e.g., causes high level of information loss). The term "adaptive pruning" is discussed in more detail later with reference to FIGS. 3-5. After the extraction of the taxonomy for the documents, the components of server 110 may utilize the extracted taxonomies for document labeling and classification. Statistical distances between representations of the document to be labeled and the taxons can be used for the labeling and classification of the document, which can be performed in unsupervised, semi-supervised or self-supervised manner. As such, various aspects of the present disclosure allow the hierarchical extraction of taxonomies for a corpus of documents and utilization of the taxonomies for document labeling and classification, as further described herein. The term "labeling" and its related variants may be understood to refer to, without limitation, to the allocation or classification of a document to one or more topics contained within the corpus of documents, and a "label" is the identifier of such allocation or classification.

It is noted that the functional blocks, and components thereof, of system 100 of implementations of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of cach respective component may be aggregated from the functionality of multiple modules residing in a single, or in multiple devices.

In some aspects, server 110, user terminal 160, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a graphical user interface (GUI) via which a user may exchange data and information with the server 110. For example, user terminal 160 may allow the user to remotely execute the extraction of taxonomies for corpus of documents, the labeling and classification of documents, perform searches, etc. For example, the user can be a subject matter expert controlling the server 110 via the user terminal 160 for executing the extraction of taxonomies and classification of documents, which the subject matter expert can then review afterwards. As another example, the GUI may include input fields that allow a user to provide parameters that characterize a search for a document. For instance, the input fields can be for users to provide parameters limiting the search for documents, examples of which include parameters specifying cluster size, taxonomy depth (e.g., number of hierarchical levels).

Data sources 170 may comprise at least one source of corpus of documents or textual data. For example, the data source(s) 170 may include a streaming news source, a database of articles, a news feed, a social media feed, another type of information feed, a news repository, an article repository, a news aggregator, a media aggregator, a database, a server, a data room, another data source, the like, or a combination thereof. The data sources 170 can be any source of documents that is capable of being queried and returning the requested or searched documents. In a particular implementation, the data from data source 170 may include or correspond to legal documents (e.g., court papers, legal invoices, etc.), financial documents (e.g., public company disclosures, financial statements, etc.), scientific documents (e.g., articles, white papers, etc.), and/or the like.

Server 110 may be configured to receive a corpus of documents from data sources 170, to perform NLP on the corpus of documents, generate graphs corresponding to the corpus of documents, perform hierarchical clustering to extract a taxonomy for the corpus of documents, and/or label and classify documents based on the extracted taxonomy. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some implementations, server 110 may be implemented, wholly or in part, on an on-site system, or on a cloud-based system. In addition, in some instances, server 110 may be configured to allow the parallel processing (e.g., using Hadoop implemented on graphics processing units) of at least some of the processing loads, such as sparse matrix multiplications executed to generate the similarity or co-occurrence matrices.

As shown in FIG. 1, server 110 includes processor 111, memory 112, database 113, NLP engine 120, clustering engine 122, taxonomy extraction engine 124, and a document classifier 126. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/ components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing received documents or text data, NLP data, matrices (e.g., similarity matrices, co-occurrence matrices, etc.), one or more feature vectors, probability distributions, metadata, training data, ML model parameters, graphs, taxonomies for corpus of documents including but not limited to taxon IDs, features, names, etc., labels, training labels, corpus topics, scores, input (e.g., from user terminal 160), other information, etc. Database 113 may be coupled to NLP engine 120, clustering engine 122, taxonomy extraction engine 124, a document classifier 126, or a combination thereof. Database 113 may be integrated into memory 112, or may be provided as a separate module. In some aspects, database 113 may be a single database, or may be a distributed database implemented over a plurality of database modules. In some embodiments, database 113 may be provided as a module external to server 110. Additionally, or alternatively, server 110 may include an interface configured to enable communication with data source 170, user terminal 160 (e.g., an electronic device), or a combination thereof.

NLP engine 120 may be configured to perform NLP based on data corresponding to a corpus of documents to generate document textual data. The corpus of documents may include legal documents (e.g., court papers, legal invoices, etc.), financial documents (e.g., public company disclosures, financial statements, etc.), scientific documents (e.g., articles, white papers, etc.), and/or the like. Performing NLP on the input documents may generate the document text data (e.g., NLP-processed data). The NLP process may recognize characters, words, sentences, punctuation marks, or a combination thereof, in the input corpus of documents. For example, the NLP performed by NLP engine 120 may include tokenization, lemmatization, stemming, phrasing, sentencization, part-of-speech tagging, dependency parsing, stop-character parsing, and named entity recognition, other processing operations, or a combination thereof. Although described as performing NLP operations on an input corpus of documents, NLP engine 120 may also be configured to perform NLP operations on labeled documents to generate training data for use in training the document classifier 126 for semi-supervised document labeling and classification.

NLP engine 120 may be configured to generate a similarity matrix for the corpus of documents that are processed by the NLP 120. Similarity matrices, which characterize the pair-wise similarities among documents within the corpus of documents based on content and context, can be computed from vector representations of the corpus of documents. One approach to construct word embeddings for the corpus of documents is the "bag of words (BOW)" representation, where each document is represented by a vector and each dimension of the vector corresponds to a particular term or word in the corpus of documents. In such representations, the value of a given dimension of a vector representing a document corresponds to the number of times or the frequency that a term appears in that document. In some instances, the BOW representation may not fully or accurately capture the importance of a term to a document. This is because terms that appear frequently in the corpus of documents may not necessarily be words that carry significant amount of information, while rare terms can have significant importance. To account for this, the frequencies in the embedding vectors can be normalized by a statistical measure that indicates the frequency with which words appear in the corpus of documents.

One approach for weighting terms that appear in a particular document against the corpus of documents is the term frequency-inverse document frequency (tf-idf) method, which combines tf and idf techniques. Term frequency represents the number of times a term appears in a document and inverse document frequency represents the inverse of the frequency of a term in the corpus of documents. Idf reduces the weight or importance of terms that occur very frequently across the corpus of documents and increases the weight or importance of those terms that occur infrequently. That is, tf-idf assigns a weight as a statistical measure used to evaluate the importance of a term in the corpus of documents. The relative "importance" of the term or word increases proportionally to the frequency such term or word appears in a document, which is offset by the frequency that term or word appears in the corpus of documents.

The NLP engine 120 may configure the embedding vectors of the corpus of documents in the BOW representation, or in the tf-tdf representation after normalization by the tf-idf method, as a BOW matrix, or a tf-idf matrix, respectively, of the corpus of documents. NLP engine 120 may then construct the similarity matrix for the corpus of documents based on the BOW matrix or the tf-idf matrix. For example, the similarity matrix can be a cosine similarity matrix constructed via a sparse matrix multiplication of the BOW matrix (e.g., (BOW matrix)·(BOW matrix)$^{transpose}$) or the tf-idf matrix (e.g., (tf-idf matrix). (tf-idf matrix)$^{transpose}$). In various embodiments, the similarity matrix values indicate that documents of the corpus that are similar to each other, for instance in content and/or context, have higher matrix elements or similarity scores, and those that are different from each other have lower matrix elements or similarity scores.

NLP engine 120 may also be configured to generate a features-domain co-occurrence matrix for the processed corpus of documents. Co-occurrence refers to the occurrence of two or more features. Examples of such features include terms or words, titles, sections, labels, topics, sentences, paragraphs, concepts, and/or the like, as well as embedding vectors thereof in the same context, for example, in the same document of a corpus of documents. The co-occurrence matrix is a matrix with elements representing the frequency of the co-occurrences. Co-occurrence matrices in features domain can be constructed by sparse matrix multiplication. For example, a co-occurrence matrix can be constructed using the afore-mentioned tf-idf matrix from the following expression; co-occurrence matrix=(tf-idf matrix)$^{transpose}$. (tf-idf matrix). As another example, a similarity matrix can be constructed using the afore-mentioned BOW matrix from the following expression; co-occurrence matrix=(BOW matrix)$^{transpose}$. (BOW matrix).

After the construction of the similarity matrix or the features co-occurrence matrix (referred hereinafter as "co-occurrence matrix" for simplicity), the clustering engine 122 may process the similarity matrix or the co-occurrence matrix to decompose or factorize the same into clusters of submatrices, which can be represented as clusters of nodes of a graph. For example, the clustering engine 122 may apply a clustering algorithm to the similarity matrix to represent the matrix as a graph where the nodes represent documents and the edges represent similarities between the documents. In such cases, densely connected nodes represent documents that are strongly similar to each other while weak or missing connections represent less similar or dissimilar documents. As another example, the clustering engine 122 may apply the clustering algorithm to the features-domain co-occurrence matrix to generate a graph of nodes representing the features and the edges representing the context of the co-occurrence matrix (the context being occurring or appearing in the same document of the corpus of documents, for example).

In various embodiments, the clustering algorithm employs statistical methods that are configured to analyze the similarity or co-occurrence matrices to discover whether documents or features of the respective matrices belong to the same class or category (e.g., cluster). In some instances, the clustering algorithm may be formulated as matrix factorization or topics modeling tasks. For example, the clustering algorithm may include a latent Dirichlet allocation (LDA), a probabilistic latent semantic analysis (pLSA), a multilayer graph clustering algorithm, a joint clustering algorithm, or a combination thereof. LDA is configured to decompose the similarity or co-occurrence matrix to sub-matrices using singular value decomposition (SVD) techniques, and the sub-matrices correspond to the clusters of nodes of the graph corresponding to the corpus of documents. pLSA instead uses a probabilistic model instead of SVD, where the probabilistic model provides the probability that a node belongs to a particular cluster.

The taxonomy extraction engine 124 is configured to extract taxonomies from the graphs by identifying groups of nodes of the graphs that may be viewed as clusters, i.e., groups of nodes that are more densely connected within the cluster than outside the cluster. To accomplish this goal, in various embodiments, the taxonomy extraction engine 124 can apply a community detection algorithm to the graph to identify or detect a community structure of nodes, e.g., groups of nodes that may be viewed or determined to be clusters. Further, the taxonomy extraction engine 124 may adaptively prune overlapping groups or clusters to form non-overlapping clusters (or taxons) that are recognizable or identifiable as such. The adaptive pruning can be based on a metric that measures the "betweenness" of nodes that connect different groups of nodes (e.g., as such, by removing the nodes with high value of the metric, the different overlapping groups of nodes can form separate clusters). For example, the metric can be the betweenness centrality of a node that characterizes the extent the node connects other nodes of the graph. The betweenness centrality is related to the percentage of shortest paths between nodes that pass through that node. In some instances, the adaptive pruning may proceed hierarchically until a pruning stop criterion (e.g., information loss threshold, minimum number of nodes, fully connected graph, modularity resolution limit, etc.) is reached. Adaptive pruning as discussed herein may be preferrable over other techniques designed to form clusters from a graph, such as the simple removal of a node that causes overlap (e.g., because that may cause information loss and reduced performance of the taxonomy), the removing of edges that may have weight below a threshold (e.g., because either the optimal threshold may not be known or may not be uniform over the graph or for the different hierarchies), or pruning based on distinct features (e.g., which may not be applicable at deep hierarchy levels because dense connectivity between nodes may stymie reliable clustering at all).

An example community detection algorithm is the Girvan-Newman community detection algorithm discussed in "Community Structure in Social and Biological Networks," by M. Girvin and M. E. J. Newman, published in PNAS, 99(12) 7821-7826 (2002), the disclosure of which is incorporated herein by reference in its entirety and references therein. The Girvan-Newman community detection algorithm introduces a new measure for graph clustering, named a modularity, which is defined as a number of connections within a group compared to the expected number of such connections in an equivalent null model (e.g., in an equivalent random graph). In particular, the modularity Q of a group of nodes may be written as $$Q = \frac{1}{2m} \sum_{i,j} [A_{ij} - P_{ij}] \delta(c_i, c_j),$$

where $c_i$ is the i-th community; $A_{ij}$ are elements of graph adjacency matrix; $d_i$ is the i-th node degree; $d_i = \Sigma_j A_{ij}$; m is a total number of links, $m = \Sigma_i d_i/2$; $P_{ij}$ is a probability that nodes i and j in a null model are connected; if a random graph is taken as the null model, then $P_{ij} = d_i d_j/2m$. In the instant application, the terms "modularity" and "modularity score" may be used interchangeably.

By construction $|Q| < 1$ and $Q = 0$ means that the group of nodes under study is equivalent to the used null model (an equivalent random graph). $Q > 0$ indicates a presence of a community structure, i.e., more links remain within communities than would be expected in an equivalent random graph. Hence, a network partition which maximizes modularity may be used to locate communities. This maximization is NP-hard and many suboptimal algorithms are suggested, for example in "Community Detection in Graphs," by S. Fortunato, published in Physics Reports, 486, pp. 75-174 (2011), which is incorporated by reference herein in its entirety and references therein. In particular, a dynamical systems formulation of modularity maximization based on a fast greedy search, discussed in "Fast Algorithm for Detecting Community Structure in Networks," by M. E. J. Newman, published in Physical Review, E 69, 066133 (2004); and in "Fast Unfolding of Communities in Large Networks," by V. Blondel et al., published in J. Stat. Mech. P10008 (2008), both of which are incorporated by reference herein in their entirety, extended with a random walk approach of "Laplacian Dynamics and Multiscale Modular Structure in Networks," by R. Lambiotte et al., published in arXiv: 0812.1770v3 (2009), which is incorporated by reference herein in its entirety, to detect multi-resolution communities beyond and below the resolution provided by the maximum modularity. Note that the community detection process is fully unsupervised clustering without any parameters used.

The dynamical systems formulation extended with a random walk model determines the modularity and the stability of clusters of a graph based on the dynamics of N random walkers on the graph. For example, the modularity of a cluster of the graph can be related to the difference in the probabilities that a random walker that starts in the cluster stays in the cluster and that two random walkers happen to be in the cluster. Similarly, the stability of a cluster can be evaluated based on the statistical properties of random walkers on the graph. For example, the stability can be related to the difference between the probability of a random walker to be in the same community or cluster after some period and the probability that two independent random walkers are in the same cluster at that time. That is, in some instances, the dynamical formulation allows one to determine the modularity and/or stability of clusters, thereby allowing one to find cluster modularity ranges having desired stability.

According, the taxonomy extraction engine 124 can apply Girvan-Newman community detection algorithm to identify clusters of nodes of the graph that have modularity $Q > 0$, i.e., to determine the presence of a cluster or community structure and the number of the communities. As mentioned above, $Q > 0$ indicates the presence of community structure in the graph; however, it has been found empirically that the modularity has to be greater than a minimum modularity threshold for a group of nodes to be recognizable or identifiable as a cluster (e.g., have a visible community structure). In some instances, this minimum modularity threshold was found empirically to be in the range from about 0.3 to about 0.35, inclusive. Further, the taxonomy extraction engine 124 can also employ the dynamical systems formulation with the random walk model to determine the stability of clusters. As such, the dynamical systems formulation allows for the detection of stable clusters as well as the determination of the modularity of the clusters and the number of clusters. If the community detection algorithm detects clusters with modularity scores lower than the minimum modularity threshold, in various embodiments, the taxonomy extraction engine 124 can adaptively prune the clusters hierarchically to form clusters at each hierarchical level having modularity exceeding the minimum modularity threshold, thereby forming a taxonomy of recognizable clusters, as discussed in more details below with reference to FIGS. 3-5.

The taxonomy of clusters may be viewed as a graph of taxons, where each taxon represents a cluster of nodes of the graph having a modularity exceeding the minimum modularity threshold. The taxonomy extraction engine 124 can then analyze the extracted taxonomy to generate a features presentation of the taxons, which for each taxon may include but is not limited to an identification of the taxon, features of the taxon (e.g., feature name, weight (e.g., the number of documents in the taxon), feature embedding, etc.), a taxon embedding in vector space, a human-readable name of the taxon, and/or the like. A taxon embedding can be a graph embedding or a collection of embedding of nodes (e.g., leaving out the relations between among the nodes). For instance, the taxonomy extraction engine 124 may compute, for a taxon, the centroid of the nodes that make up the taxon, and assign a name to the taxon based on the location or proximity of the centroid. For example, the taxon may be named based on the node(s) that are closest to the centroid. As another example, the taxonomy extraction engine 124 may assign a human-readable name (e.g., taxon topic) to a taxon based on the "parent" of the taxon on the graph of taxons that include the taxon. In some instances, taxon topic(s) can be based on aggregated cluster labels (e.g., summary) at high hierarchy levels, if any, and/or previous leading labels on edges, if any (if any).

Document classifier 122 may be configured to perform unsupervised, semi-supervised, or self-supervised labeling and classification of documents based on the taxonomy extracted by the taxonomy extraction engine 124. For example, as discussed above, a graph corresponding to a corpus of documents may be processed by the NLP engine 120, the clustering engine 122, and the taxonomy extraction engine 124, to extract a hierarchical taxonomy composed of taxons, where each taxon of the taxon graph represents a cluster of nodes of the graph. When a document that has been processed by the NLP engine 120 is received at the document classifier 126, in various embodiments, the document classifier 126 may classify and label the document based on the embedding vector of the document and the afore-mentioned features presentations of the taxons, as discussed in more details with reference to FIGS. 6-8.

Figure 2:
FIG. 2 is a work flow illustrating a functionality of the system of FIG. 1 according to one or more aspects.

The functionality of server 110 will now be discussed with respect to the flow diagram illustrated in FIG. 2. FIG. 2 shows a flow diagram illustrating functionality of system 100 for performing unsupervised or semi-supervised classification and labeling of documents with the use of taxonomies that are extracted based on hierarchical clustering on graphs related to corpus of documents. Blocks of method 200 illustrated in FIG. 2 may be performed by one or more components of system 100 of FIG. 1. For example, blocks 210 and 220 may be performed by NLP engine 120, block 230 may be performed by the clustering engine 122, blocks 240 and 250 may be performed by the taxonomy extraction engine 124, and blocks 270 and 280 may be performed by document classifier 126.

At block 210, a corpus of documents is received, for example, at a processor configured to cause execution of an NLP engine. The corpus of documents may contain textual data and may be retrieved from databases (e.g., via a query). The corpus of documents may belong to one or more domains, such as but not limited to legal documents, financial documents, scientific documents, business documents, etc. The NLP engine may perform NLP on the corpus of documents, the processing including but not limited to tokenization, lemmatization, stemming, phrasing, sentencization, part-of-speech tagging, dependency parsing, stop-character parsing, and named entity recognition, other processing operations, or a combination thereof.

At block 220, the NLP engine computes a similarity matrix or a co-occurrence matrix for the corpus of documents. In some instances, the NLP engine may configure embedding vectors of the corpus of documents in the BOW representation or the tf-tdf representation as a BOW matrix or a tf-idf matrix, respectively. Then the NLP engine may construct the similarity matrix or features co-occurrence matrix based on sparse matrix multiplications of the BOW matrix or tf-tdf matrix, respectively.

At block 230, a clustering algorithm may be applied to the similarity matrix or the features co-occurrence matrix to construct a graph that corresponds or represents the corpus of documents. For example, a topic modeling or clustering algorithm such as but not limited to a LDA, a pLSA, a multilayer graph clustering algorithm, a joint clustering algorithm, or combination thereof, may be used to generate the graph from the similarity or features co-occurrence matrix. For instance, LDA or pLSA algorithms may factorize or decompose the similarity matrix or the features co-occurrence matrix, which may be quite sparse, into sub-matrices (lower dimensional matrices compared to the similarity matrix or features co-occurrence matrix), which can then be expressed as a graph with the nodes representing documents and the edges representing the similarity of the documents (e.g., for the similarity matrix) or the context of the co-occurrence (e.g., for the features co-occurrence matrix).

At block 240, a community detection algorithm such as but not limited to the Girvan-Newman algorithm, the dynamical systems formulation, etc., may be applied to the graph to detect the presence and number of clusters on the graph. For example, the community detection algorithm may compute the modularity of the graph, and if the modularity is found to be greater than 0, then that may be an indication that the graph has community or cluster structure. However, if the modularity is found to be between 0 and the minimum modularity threshold for a cluster to be recognizable or identifiable, then, at block 250, the graph may be adaptively pruned to form one or more clusters that have modularity scores exceeding the minimum modularity threshold, wherein each of these one or more clusters forms a taxon node (alternatively referred herein as a "taxon") of the taxonomy or taxon graph.

In some instances, to perform the adaptive pruning, the taxonomy extraction engine may compute the betweenness centrality of the nodes of the graph, and remove from the graph that node with a high or the highest betweenness centrality. In other words, by removing the node that connects other nodes of the graph the most, the taxonomy extraction engine decomposes the graph into clusters that are more modular (e.g., have higher modularity than the graph without pruning). The taxonomy extraction engine may then compute the betweenness centrality scores of the rest of nodes of the graph, and repeat the process by removing the node with the highest score. The taxonomy extraction algorithm may adaptively prune the graph until a pruning stop criteria is achieved. As noted above, the one or more clusters achieving modularity scores that exceed the minimum modularity threshold can be a pruning stop criterion. Other examples of pruning stop criteria include impossibility of further pruning (e.g., because the graph is fully connected or the minimum size of the one or more clusters is equal to 2), or a modularity resolution limit has been achieved. The modularity resolution limit is discussed in the afore-mentioned article titled "Community Detection in Graphs," by S. Fortunato, which is incorporated by reference herein in its entirety and references therein.

At block 270, an input document is received at a processor for labeling and classification. The processor may be configured to execute a NLP engine to process the input document as discussed above with reference to block 210. For example, the input document may be processed to generate a features embedding vector. At block 280, the input document may be labeled and classified based on the features embedding vector of the input document and a representation (e.g., features probability distribution or features embedding vector) of the extracted taxons from block 250. The classification of the input document can be any one of unsupervised, semi-supervised, or self-supervised classifications, discussed in more details with reference to FIG. 6-8.

Figure 3:
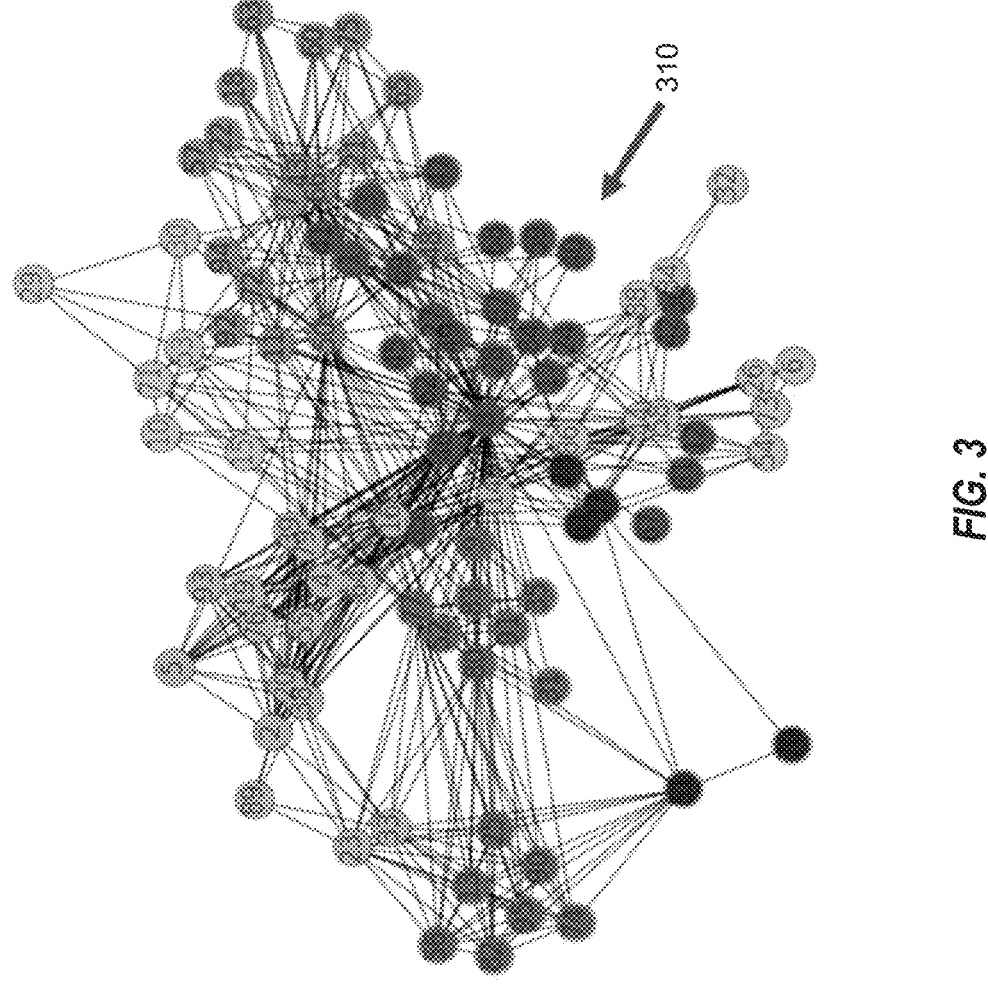
FIG. 3 is an example hierarchical clustering in features domain according to one or more aspects.

The workflow of FIG. 2 can be illustrated with reference to FIGS. 3, which shows a graph 300 for a corpus of 100 legal documents, and FIGS. 4A-4C, which show the adaptive pruning of a cluster of the graph 300. The graph 300 depicted in FIG. 3 was generated using the graph generation methods discussed above. Initially, the 100 legal documents were processed using a NLP engine to generate feature embedding vectors of the legal documents, where the features are keywords selected from the corpus of documents. Features co-occurrence matrix was then constructed using the feature embedding vectors to generate the graph 300 in features domain that corresponds to the corpus of 100 legal documents.

Once the graph 300 is obtained, in various embodiments, a community detection algorithm may be applied to the graph 300 to determine the presence or number of community structure contained therein. For example, the Girvan-Newman algorithm may be applied to the graph 300 to compute the modularity of the graph 300. As another example, the dynamical systems formulation can be applied to the graph 300 to compute the modularity thereof and further determine its stability (e.g., using the random walk model as discussed above). For the graph 300 shown in FIG. 3, the modularity was found to be higher than the minimum modularity threshold, indicating the presence of a community structure in the graph 300 (e.g., because the modularity is greater than 0) and that the graph 300 has recognizable or identifiable cluster(s) (e.g., because the modularity is greater than the minimum modularity threshold). It was found that there were multiple recognizable or identifiable clusters and the number of clusters of these clusters was also determined (e.g., the seven clusters identified in FIG. 3 with different colors or shades).

Because the graph 300 was found to have modularity exceeding the minimum modularity threshold (e.g., and as such the pruning stop criterion is met), there is no need to adaptively prune the graph 300 at this hierarchy level ("hierarchy level 0") to form recognizable or identifiable clusters. In such cases, the graph 300 may be hierarchically clustered by proceeding to the next hierarchy level of the graph 300 and determining whether the clusters at that next hierarchy level have modularity scores exceeding the minimum modularity threshold. For example, as noted above, it was found that graph 300 has multiple (seven) clusters, and the hierarchical clustering of the graph 300 may include determining the modularity of each of the multiple clusters of the graph 300. This hierarchical clustering process is discussed with reference to one of the clusters (cluster 310 identified by the arrow in FIG. 3); it is to be understood that the same process may be applied to any of the other clusters of the graph 300.

A community detection algorithm may be applied to cluster 310 to compute its modularity. If this modularity exceeds the minimum modularity threshold, then cluster 310 may be understood to be a recognizable or identifiable cluster, and the hierarchical clustering process may proceed to the next hierarchy level, i.e., to the clusters of cluster 310 ("hierarchy level 1"), until a pruning stop criterion is met. If, on the other hand, the modularity can be greater than 0 but no greater than the minimum modularity threshold, indicating the presence of community structure but not recognizable or identifiable clusters. In such cases, the betweenness centrality scores of the nodes of cluster 310 may be computed to identify the nodes with the largest centrality in cluster 310, i.e., the nodes that may serve as bridges between different parts (e.g., clusters) of cluster 310. In some instances, the hierarchical clustering process may include the removal of a node based on the computed betweenness centrality scores. For example, the node having one of the highest (e.g., or the highest) betweenness centrality scores may be removed from cluster 310 as part of the hierarchical clustering of cluster 310, to convert cluster 310 to one or more clusters that have modularity scores exceeding the minimum modularity threshold. FIG. 4A shows the cluster in the same hierarchy level (hierarchy level 1) that is the result of the removal, from cluster 310, of the node with the highest betweenness centrality score.

Figures 4A, 4B, 4C:
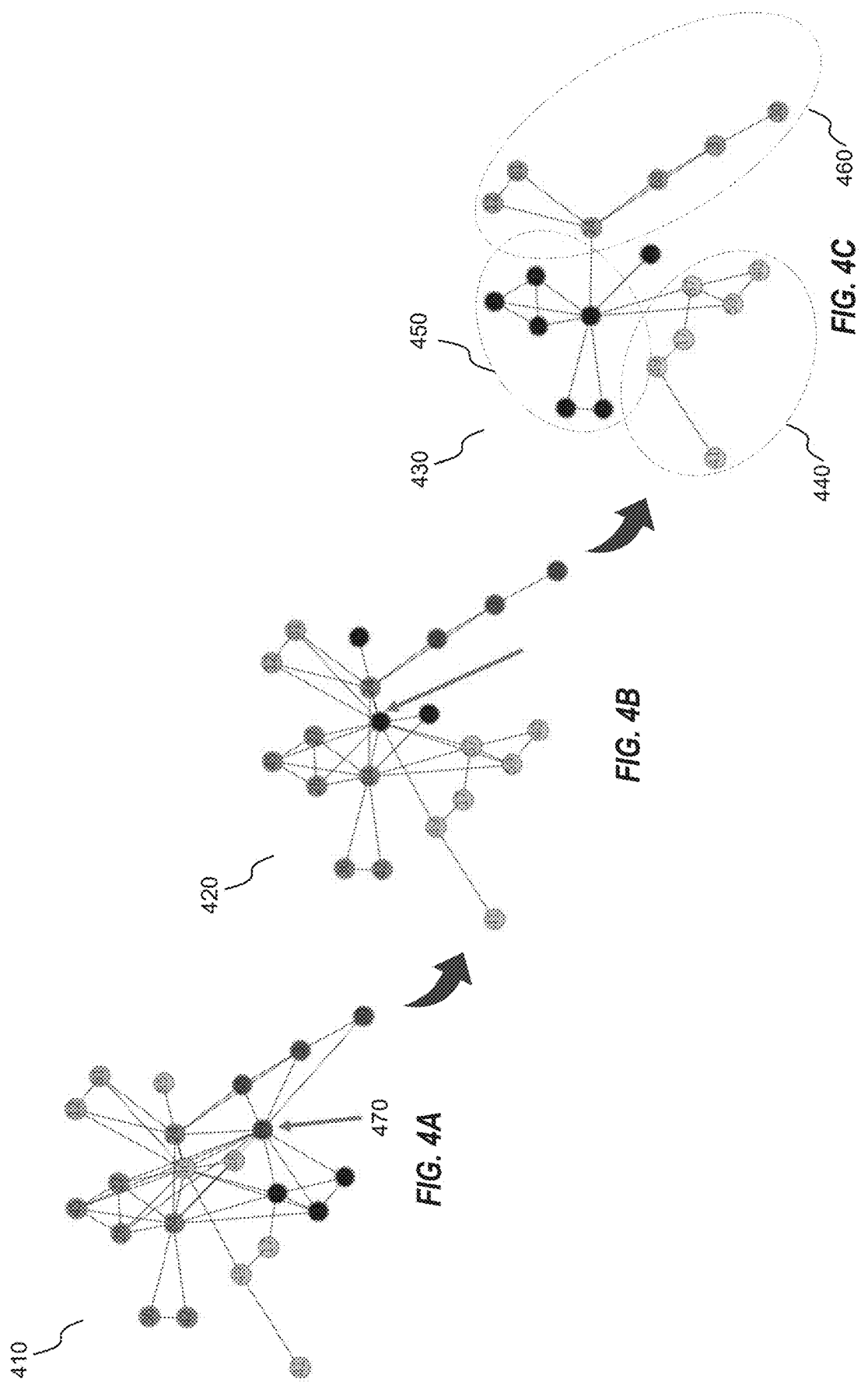
FIGS. 4A-4C illustrate the adaptive pruning of a hierarchical clustering according to one or more aspects.

FIGS. 4A-4C show successive removals of nodes with highest betweenness centrality scores from clusters to form successive clusters that have higher modularity than the preceding ones. For example, as noted above, FIG. 4A shows the cluster 410 that is formed when the node from cluster 310 of FIG. 3 with the highest betweenness centrality score is removed from cluster 310. The hierarchical clustering process then includes the computation of the betweenness centrality scores of the nodes of cluster 410, and the removal of the node 470 with the highest betweenness centrality score, resulting in the cluster 420 of FIG. 4B. In some instances, whether the hierarchical clustering process via the adaptive pruning of nodes continues depends on whether a pruning stop criterion is fulfilled. For example, the pruning stop criterion can be whether the resulting cluster (e.g., cluster 420) has a modularity score exceeding the minimum modularity threshold, or even higher modularity limit. As another example, the pruning stop criteria can be the modularity resolution limit being reached, or the resulting cluster (e.g., cluster 420) being a fully connected cluster or having minimal size (e.g., only two nodes). Depending on whether a chosen pruning stop criterion is fulfilled or not, the hierarchical clustering can proceed repeatedly as discussed above. In some instances, the hierarchical clustering process can continue to the next hierarchy level ("hierarchy level 2"), by determining the number of clusters contained within a just formed cluster and then repeating the process discussed above. For instance, FIG. 4C shows an example formation of three clusters 440, 450, 460 from cluster 420 as described above. In such cases, a community detection algorithm can be applied to one or more of the three clusters 440, 450, 460, and if there are multiple clusters, the adaptive pruning process as discussed above can be repeated to each of the clusters 440, 450, 460.

The clusters with modularity scores exceeding the minimum modularity threshold at each hierarchical level (e.g., graph 310 at hierarchy level 0, the seven clusters of graph 300 (e.g., including cluster 310) at hierarchy level 1, clusters 440, 450, and 460 at hierarchy level 2, etc.) form a taxonomy, i.e., a graph of taxons where the taxons correspond to each cluster. That is, the hierarchical clustering process applied to graph 300 as discussed above extracts a taxonomy where the root node or root taxon of the taxonomy corresponds to the graph 300 at the first hierarchy level (hierarchy level 0). The taxonomy includes seven taxons at hierarchy level 1 where each of these taxons correspond to the seven clusters of graph 300 (e.g., one of the seven taxons correspond to cluster 310). In addition, the taxon corresponding to cluster 310 may have three children taxons at the next hierarchy level, hierarchy level 2, corresponding to the three clusters 440, 450, 460, respectively; and so on. Accordingly, a taxonomy extraction algorithm that is applied to a graph corresponding to a corpus of documents (e.g., such as graph 300 corresponding to the 100 legal documents) can extract a taxonomy from the graph based on an application of a hierarchical clustering process on the graph (e.g., including adaptive pruning of nodes). In such cases, the taxonomy may be viewed as a taxon graph where the root taxon node corresponds to the graph 300 and the taxon nodes correspond to the clusters of the graph 300 (e.g., such as clusters 310, 440, 450, and 460).

Figure 5:
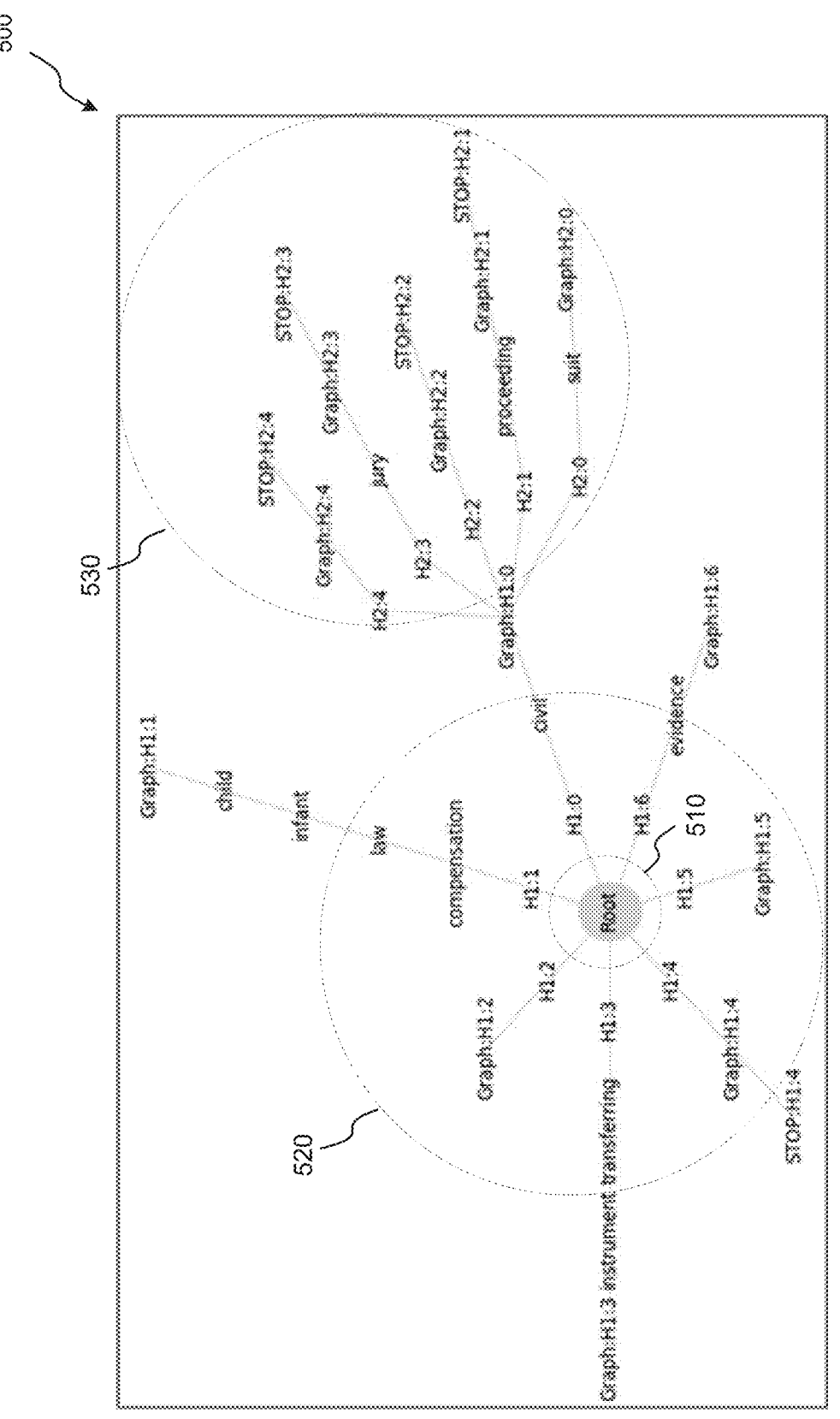
FIG. 5 illustrates an example extracted taxonomy with two hierarchical levels according to one or more aspects.

FIG. 5 illustrates an example visualization of a taxonomy 500 with two hierarchical levels extracted from a graph corresponding to a corpus of documents according to one or more aspects. A graph corresponding to a corpus of 100 legal documents was constructed and the taxonomy 500 was extracted from the graph, as discussed above with reference to FIG. 4. The first hierarchy level 510 (e.g., hierarchy level 0) of the taxonomy 500 includes a root node corresponding to or representing the graph itself. An application of a community detection algorithm to the graph detects the presence of a community structure of seven clusters, corresponding to H1:0-H1:6 at the next hierarchy level 520 (e.g., hierarchy level 1).

As discussed above, the generation or extraction of taxonomies from graphs corresponding to corpuses of documents includes the application of the clustering process at each hierarchy level of the graph. FIG. 5 shows this hierarchical clustering process with respect to taxon node H1:0 at hierarchy level 1, which corresponds to one of the seven clusters of the graph (e.g., of the corpus of the 100 legal documents). The hierarchical clustering process includes a taxonomy extraction engine computing the betweenness centrality scores of the nodes of this one of the seven clusters, and discovering that the node labeled with the topic "civil" has the highest betweenness centrality score than any of the other nodes. As such, the taxonomy extraction engine removes or prunes that node, resulting in a new cluster ("Graph:H1:0"). This cluster may not be further pruned because it satisfies a chosen pruning stop criterion (e.g., the modularity score of Graph:H1:0 exceeding the minimum modularity threshold), and may be viewed as a taxon node of the taxonomy 500. An application of a community detection algorithm to Graph:H1:0 detects the presence of a community structure of five clusters, H2:0-H2:4, at the next hierarchy level 530 (e.g., hierarchy level 2). In such cases, the hierarchical clustering process proceeds to this hierarchy level 2 and performed to each of these clusters (e.g., by adaptively pruning nodes based on betweenness centrality scores as discussed above). When a cluster satisfies a prune stop criterion (e.g., denoted with "stop" in FIG. 5), the cluster may not be pruned further and corresponds to a taxon of the taxonomy 500 at that hierarchical level 530. For example, H2:2 and H2:4 are shown as having satisfied a prune stop criterion without any node being pruned, and H2:1 and H2:3 are shown to have satisfied a prune stop criterion after pruning of some nodes with highest betweenness centrality scores. In such cases, Graph H2:1-Graph H2:4 may be considered as taxon nodes of the taxonomy 500.

Figure 6:
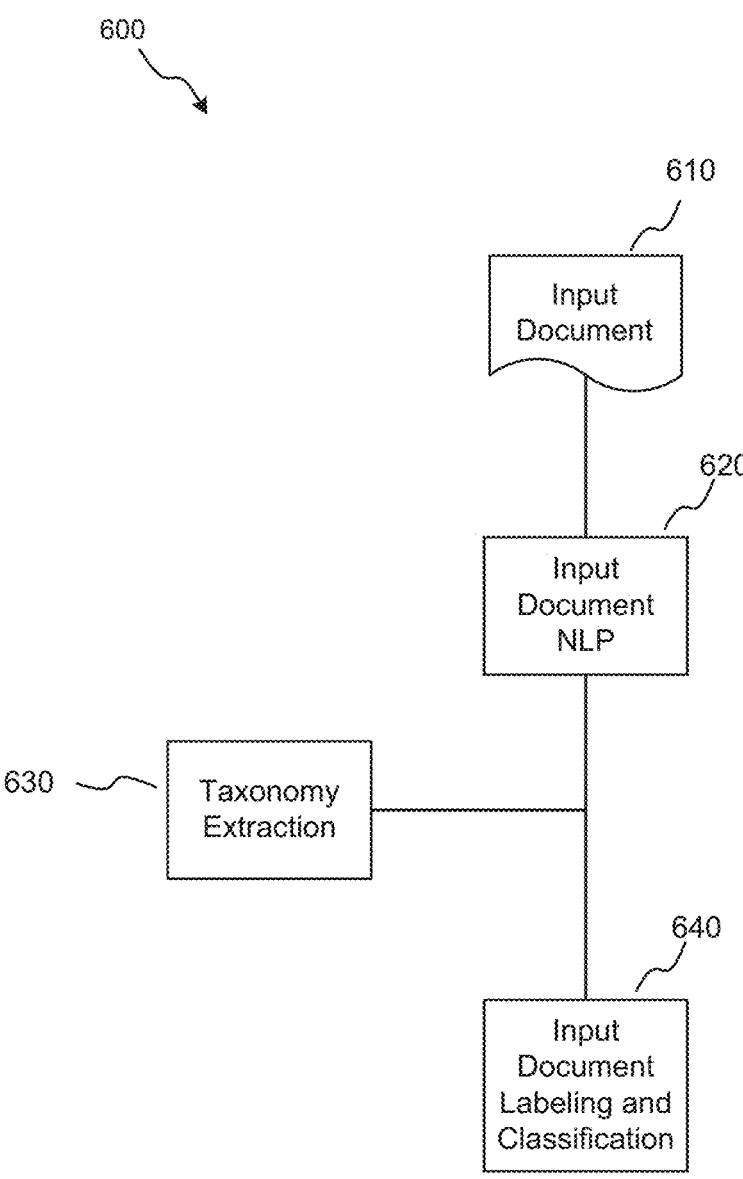
FIG. 6 is a flow diagram illustrating unsupervised document classification based on extracted taxonomies for documents according to one or more aspects.

Referring to FIG. 6, an example of a process for performing unsupervised document classification based on extracted taxonomies for documents according to one or more aspects is shown as a process 600. Blocks of method 600 illustrated in FIG. 6 may be performed by one or more components of system 100 of FIG. 1. For example, block 610 may be performed by server 110, block 620 may be performed by NLP engine 120, block 630 may be performed by the taxonomy extraction engine 124, and block 640 may be performed by document classifier 126.

At block 610 of process 600, an input document is received by a processor for labeling and classification. In various embodiments, the document can be a legal document, a financial document, a scientific document, and/or the like. For example, the document can be a newly available or generated document (e.g., a new court ruling, financial data or disclosure, etc.) obtained by a content and enhanced service provider that wishes to label and classify the new document for use by its clients.

At block 620 of process 600, the processor uses a NLP engine to process the input document as disclosed above to generate a representation of the input document. For instance, the NLP engine may perform, on the input document, tokenization, lemmatization, stemming, phrasing, sentencization, part-of-speech tagging, dependency parsing, stop-character parsing, and named entity recognition, other processing operations, a combination thereof, and/or the like, to extract features of the input document, from which a representation of the input document can be generated. In some instances, the input document may have been included in the corpus of documents, then features of the input document are a subset of all features of the corpus of documents. In other instances, the input document was not included into the corpus used to build the taxonomy, but the input document may have features which are a subset of all features of the given corpus of documents, then this document can be classified based on existed taxonomy labels. In yet other instances, the input document may have new feature(s) which are not included into the corpus of documents, then the system may rise a flag to notify a user that this document includes new topic(s) which is out of taxonomy and the taxonomy may need to be updated. A user may decide to tolerate the existence of new topic(s) or rebuild taxonomy. Also a user may set a threshold indicating that once a number of new features (or new topics) exceed a user-defined threshold, the system automatically updates the taxonomy. In various embodiments, the NLP engine can extract features from the input document and define a probability distribution over the features for representing the input document. That is, the NLP engine may construct a probability distribution over the extracted features that may be used as a representation of the input document in features space.

In some instances, the NLP engine may process the features to construct a features embedding vector that may serve as a representation of the input document. As a non-limiting illustrative example, the features can be words extracted from the input document, and the NLP engine may construct word embedding vectors for the input document using the afore-mentioned BOW or tf-idf representations. In some instances, the NLP engine may process the features to construct a weighted graph based on the extracted features that may serve as a representation of the input document. For example, the features may be denoted or represented by nodes of the graph and the relationship between the features (e.g., co-occurrence, semantic relationship, syntactic relationship, etc.) may be denoted by edges that have associated therewith weight factors quantifying the strength of the relationship between features. The NLP engine may also construct a graph embedding of the weighted graph. That is, the NLP engine may process the weighted graph to transform the nodes and edges into a graph embedding in vector space that maximally preserves graph properties such as but not limited to graph structure, information contained therein (e.g., weights associated with the edges), etc. In such cases, the graph embedding can also be used as a representation of the input document. Other techniques for constructing graph embedding use deep learning architectures such as but not limited to graph neural networks (GNN), transformers, tensor networks, dynamic networks, adaptive networks, semantic networks, anthologies etc. Accordingly, the probability distribution over the extracted features, the features embedding vector, the weighted graph, and/or the graph embedding thereof, can be used as representations of the input document.

At block 630 of process 600, a taxonomy extracted from a corpus of documents by a taxonomy extraction engine is received or otherwise obtained at the processor. For example, the taxonomy may be extracted from a graph that corresponds to the corpus of documents as discussed above, in particular with reference to the illustrative examples of FIGS. 3-6. The taxonomy may be a hierarchical taxonomy with a root taxon node at the highest hierarchy level and multiple taxon nodes at one or more lower hierarchy levels, with the root taxon node and the multiple taxon nodes at the lower hierarchy levels connected via edges. That is, each taxon node, which corresponds to a cluster of nodes of the graph that corresponds to the corpus of documents, may have a single parent taxon node at an immediately preceding higher hierarchy level and one or more children taxon nodes at an immediately succeeding lower hierarchy level.

Accordingly, a taxonomy may be expressed as or represented by a set of its taxons, wherein the taxon set may include all or some of the taxons of the taxonomy. For example, the taxon set can include all the taxons of the taxonomy and be expressed as follows: {taxon node at hierarchy level 0, taxon nodes at hierarchy level 1, taxon nodes at hierarchy level 2, . . . }. As another example, the taxon set may include a subset of the taxons of the taxonomy. For instance, the taxon set can include taxons that belong to only one (e.g., or in general only a select number) of the hierarchy levels of the taxonomy. In yet another example, the taxon set can include only end taxons, i.e., the taxon nodes at the ends of the taxonomy graph that have no child taxon node of their own. It is to be understood that the above examples are for illustration purposes and that the taxon set can include any one of the taxon nodes of the taxonomy.

Each taxon of the taxonomy (e.g., and as such each taxon in the taxon set) can be expressed as or represented by a probability distribution over the features of the corpus of documents from which the taxonomy is extracted. That is, for example, the taxonomy extraction engine may construct for each taxon of the taxonomy a probability distribution over the features of the corpus of documents that may be used as a representation of the taxon in features space. Further, the taxonomy extraction engine may analyze each taxon to construct an embedding vector that may serve as a representation of the taxon. For example, the taxonomy extraction engine may use the afore-mentioned graph embedding methods to construct the embedding vector.

In some instances, the taxonomy extraction engine may process each taxon to construct a weighted graph that may serve as a representation of the taxon. As discussed above, a taxon represents a cluster of nodes of the graph that corresponds to the corpus of documents, where the nodes are connected to each other with edges that have associated therewith weight factors quantifying the strength of the relationship between the nodes. The nodes represent the corpus of documents and the edges represent the relationship between the documents, which can be a co-occurrence relationship, a semantic relationship, a syntactic relationship, adjacency relationship, etc. In some instances, the taxonomy extraction engine may also construct a graph embedding of the weighted graph. That is, the taxonomy extraction engine may process the weighted graph to transform the nodes and edges into a graph embedding in vector space that maximally preserves graph properties such as but not limited to graph structure, information contained therein (e.g., weights associated with the edges), etc. In such cases, the graph embedding can also be used as a representation of the taxon. Accordingly, each taxon of the taxonomy may be represented by a probability distribution over the features of the corpus of documents, an embedding vector, a weighted graph, and/or a graph embedding of the weighted graph.

At block 640 of process 600, a document classifier may label and/or classify the input document based on the probability distribution associated with the input document and the probability distribution associated with each taxon of the set of taxons of the taxonomy. The document classifier can compute a statistical distance between the input document probability distribution and the taxon probability distributions of the set of taxons. Statistical distances can also be computed between structural embeddings such as GNN embeddings, multi-dimensional tensor embeddings, tensor network embeddings, etc., representing the input document and the set of taxons. The document classifier can then classify the input document to one or more of the taxons and identify the labels for the input document from the taxon labels based on the computed statistical distance. For example, the input document can be classified to a given taxon and labeled by the labels of the given taxon when the statistical distance between the input document and the given taxon is vanishingly small. As another example, the input document can be classified (e.g., multi-class classification) to multiple taxons and labeled by the labels of these multiple taxons when the statistical distances between the input document and the multiple taxons are finite and below certain statistical thresholds. In such instances, the labels for the input document can be a weighted average of the labels of the taxons, where the weight assigned to the labels of a taxon are proportional to the computed statistical distance of that taxon from the input document. A document may be classified by adding weighted labels and associated textual descriptions collected from relevant taxons. In some cases, the relevant taxons may also include document identifications. Examples of the statistical distance include the Kullback-Leibler (KL) divergence, the Jensen-Shannon (JS) divergence, the Bregman divergence, etc., that are formulated to measure the differences between distributions.

As a non-limiting illustrative example, consider the case where the set of taxons representing the taxonomy includes three taxons: {Taxon A, Taxon B, Taxon C}, where each is represented by a respective probability distributions (PDs), $PD_A$, $PD_B$, and $PD_C$, over features of the corpus of documents corresponding to the taxonomy. In such cases, the document classifier may compute the KL divergences $KLD_A$, $KLD_B$, and $KLD_C$, between the probability distribution of the input document, PD ID, and each of $PD_A$, $PD_B$, and $PD_C$, respectively. The document classifier can then determine, based on $KLD_A$, $KLD_B$, and $KLD_C$, to which one, which two, or all three of the taxons, to classify the input document. Further, the document classifier can also determine the labels for the input document based on of which one, which two, or all three, of the three taxons with which to label the input document. For example, if it was found that $KLD_A \approx KLD_B \ll KLD_C$, then the input document may be labelled with the weighted average of the labels of Taxon A and Taxon B weighted with $KLD_A$ and $KLD_B$, respectively, but not with the labels of Taxon C (e.g., and accordingly classified to Taxon A and Taxon B but not to Taxon C).

Figure 7A:
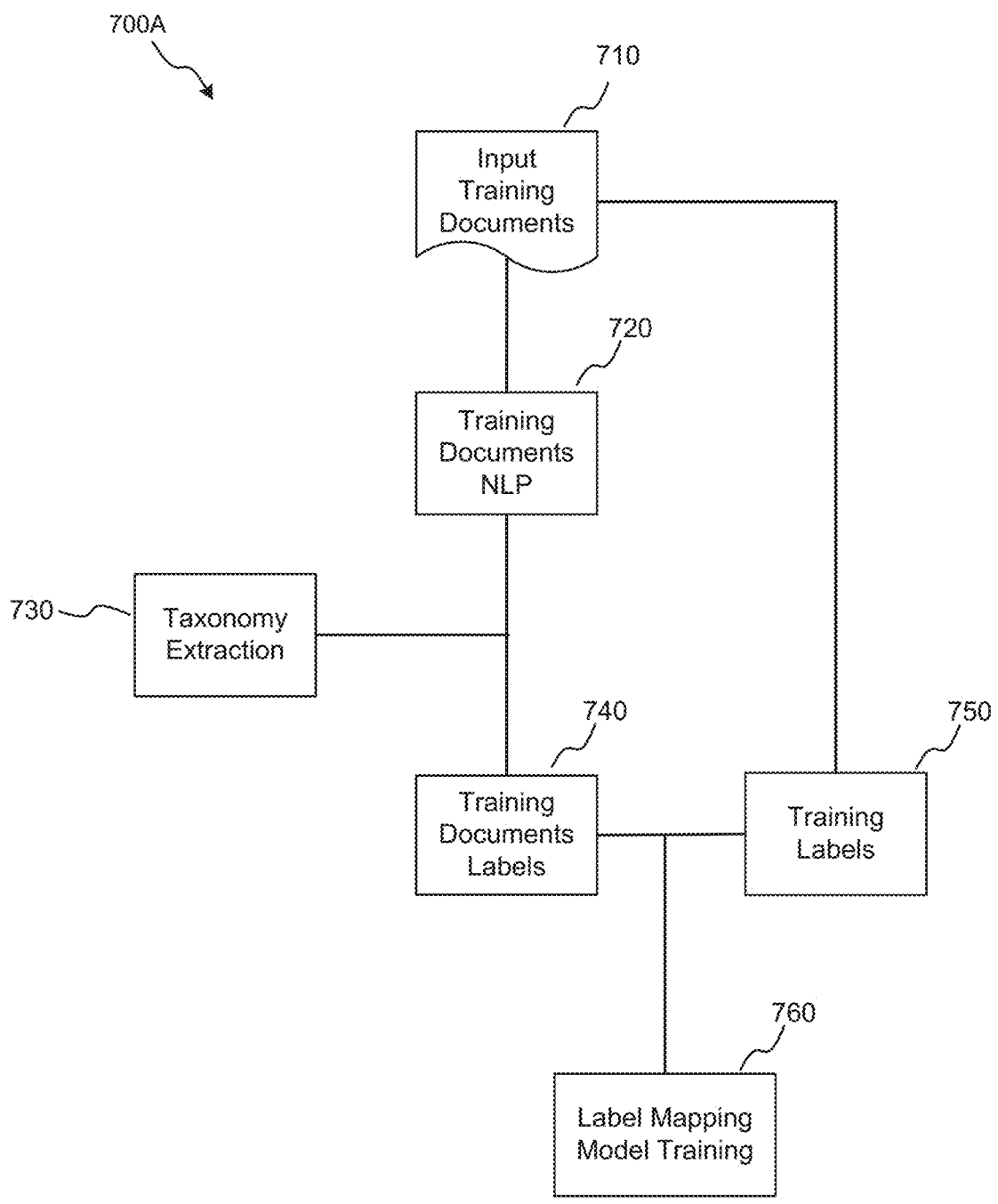
FIGS. 7A-7B are flow diagrams illustrating semi-supervised document classification based on extracted taxonomies for documents according to one or more aspects.

Referring to FIG. 7A, shown is an example of a process 700A for a semi-supervised training of a label mapping model based on an extracted taxonomy of a corpus of documents for use in predicting labels for an input document according to one or more aspects. Blocks of method 700A illustrated in FIG. 7A may be performed by one or more components of system 100 of FIG. 1. For example, block 710 may be performed by server 110, block 720 may be performed by NLP engine 120, block 730 may be performed by the taxonomy extraction engine 124, and blocks 740, 750, and 760 may be performed by document classifier 126. In some implementations, operations of process 700A shown in FIG. 7A may include or correspond to operations described with reference to method 600 of FIG. 6. For example, block 710 may correspond to or include the operations of block 610 as applied to a set of input training documents, block 720 may correspond to or include the operations of block 620 as applied to the set of input training documents, block 730 may correspond to or include the operations of block

630, and block 740 may correspond to or include the operations of block 640 as applied to the set of input training documents.

That is, a set of input training documents received at a processor at block 710 may be processed using a NLP engine at block 720, and the labels of the set of input training documents may be extracted or determined at block 740 based on a taxonomy extracted at block 730, using operations discussed above with reference to FIG. 6. In some instances, the extracted or determined training documents labels and training labels of a small portion of the set of input training documents can be used for a semi-supervised training of a label mapping model. For example, at block 750, training labels of a small portion of the set of input training documents may be provided to the label mapping model. In such cases, the training labels may not include labels for the rest of the set of input training documents. At block 760, based on the mappings between the training labels of the small portion of the set of input training documents and the extracted labels of the small portion of the set of input documents, the processor trains the label mapping model to predict the mappings for the rest of the set of input training documents (e.g., for which no training labels are provided at block 750). The semi-supervised label mapping model can then be used to map the labels of input documents that are received at the processor for labeling and classification, as discussed below with reference to FIG. 7B.

As an example illustration, subject matter experts (SMEs) may label a set of training documents at block 750. The same set of documents may be processed using a NLP engine at block 720, and a taxonomy for the set of documents may be extracted as discussed above at block 730, where the taxonomy includes topics associated with the taxons. Then, a mapping model may be built at block 760 based on the training labels from the SMEs and the extracted topics of the taxonomy, where the mapping model maps the extracted labels of the topics to the training labels. This mapping model can then be used to predict the labels of input documents as discussed below with reference to FIG. 7B.

Figure 7B:
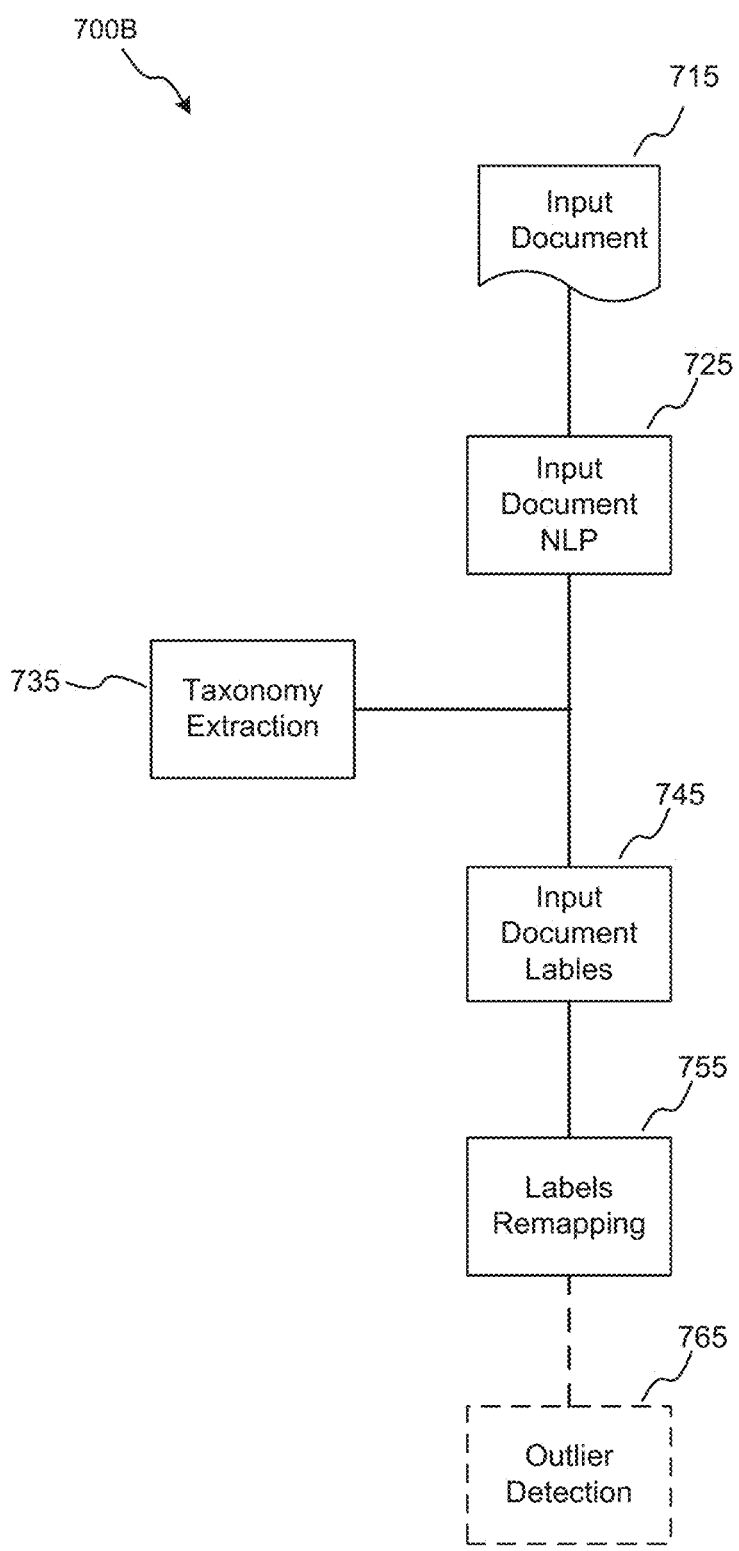

Referring to FIG. 7B, an example is shown of a process 700B for predicting labels for an input document based on an extracted taxonomy of a corpus of documents and a semi-supervised label mapping model, according to one or more aspects. Blocks of method 700B illustrated in FIG. 7B may be performed by one or more components of system 100 of FIG. 1. For example, block 715 may be performed by server 110, block 725 may be performed by NLP engine 120, block 735 may be performed by the taxonomy extraction engine 124, and blocks 745, 755, and 765 may be performed by document classifier 126. In some implementations, operations of process 700B shown in FIG. 7B may include or correspond to operations described with reference to method 600 of FIG. 6. For example, block 715 may correspond to or include the operations of block 610, block 725 may correspond to or include the operations of block 620, block 735 may correspond to or include the operations of block 630, and block 745 may correspond to or include the operations of block 640.

That is, an input document may be received at a processor at block 715 for labeling and classification. At block 725, a NLP engine performs NLP on the input document to define a features probability distribution of the input document. Further, at block 735, a taxonomy extraction engine extracts a taxonomy. Then at block 745, a document classifier computes a statistical distance (e.g., the KL divergence) between the input document probability distribution and the taxon probability distributions of a set of taxons of the taxonomy and extracts labels for the input document from the taxonomy. At block 755, once the labels for the input documents are obtained based on the taxonomy, the processor uses a trained label mapping model (e.g., such as the semi-supervised label mapping model of FIG. 7A) to map the extracted labels. For example, the mapping model can map the extracted labels of the input document to the training labels from the SMEs. That is, process 700B allows for an efficient and high speed automatic labeling of massive amount of input documents based on the labeling of a small amount of training documents by SMEs.

Further, at block 765, a label of an input document that is extracted from the taxonomy may be detected as an outlier or new topic. For example, the label of the input document may not map to another label. For instance, the mapping model may fail to map the label to any of the training labels of the SMEs.

Figure 8:
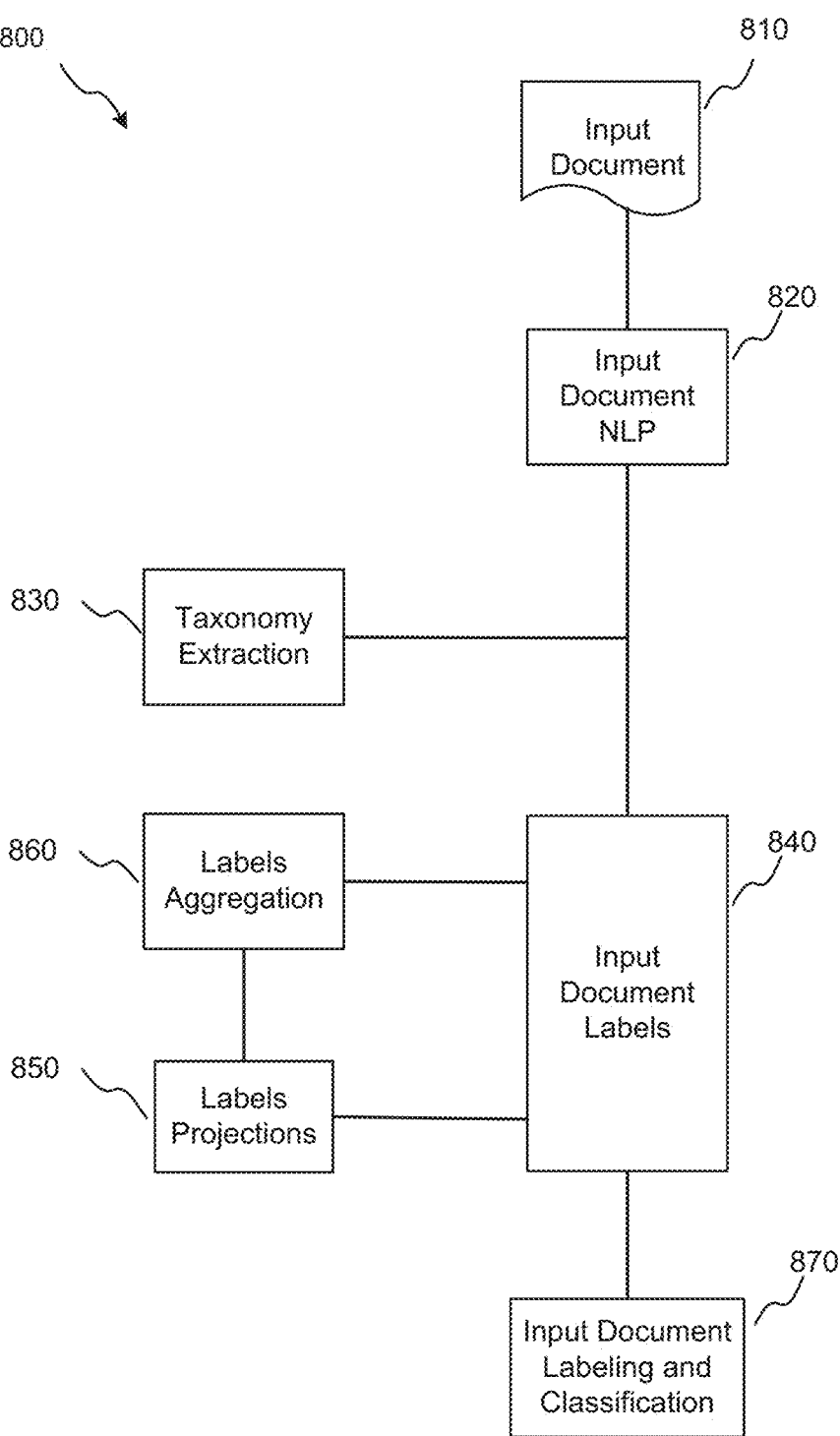
FIG. 8 is a flow diagram illustrating self-supervised document classification based on extracted taxonomies for documents according to one or more aspects.

Referring to FIG. 8, an example for performing a self-supervised document classification based on extracted taxonomies for documents according to one or more aspects is shown as a process 800. Blocks of method 800 illustrated in FIG. 8 may be performed by one or more components of system 100 of FIG. 1. For example, block 810 may be performed by server 110, block 820 may be performed by NLP engine 120, block 830 may be performed by the taxonomy extraction engine 124, and blocks 840, 850, 860, and 870 may be performed by document classifier 126. In some implementations, operations of process 800 shown in FIG. 8 may include or correspond to operations described with reference to method 600 of FIG. 6. For example, block 810 may correspond to or include the operations of block 610, block 820 may correspond to or include the operations of block 620, block 830 may correspond to or include the operations of block 630, and block 850 may correspond to or include the operations of block 640.

That is, an input document may be received at a processor at block 810 for labeling and classification. At block 820, a NLP engine performs NLP on the input document to define a features probability distribution of the input document. Further, at block 830, a taxonomy extraction engine extracts a taxonomy. Then at block 840, a document classifier computes a statistical distance (e.g., the KL divergence) between the input document probability distribution and the taxon probability distributions of a set of taxons of the taxonomy and extracts labels for the input document from the taxonomy. At block 850, the processor determines relationships between the labels, where the relationships may be determined by constructing a projection matrix label projections may be calculated. The projection matrix may indicate predicted relationships between the labels, which may then be aggregated and validated against the taxonomy before being applied to the documents or for training (e.g., in a self-supervised manner).

FIG. 9 is a flow diagram of a method 900 for performing unsupervised hierarchical clustering on graphs that correspond to corpus of documents to extract taxonomies for use in classifying and labelling documents, according to one or more aspects. In some implementations, the operations of method 900 may be stored as instructions that, when executed by one or more processors (e.g., the one or more processors of a computing device or a server), cause the one or more processors to perform the operations of method 900. In some implementations, method 900 may be performed by system 100 of FIG. 1, one or more components to execute the operations described with reference to FIG. 2, one or more components to execute the operations described with reference to FIG. 6, one or more components to execute the operations described with reference to FIG. 7, or one or more components to execute the operations described with reference to FIG. 8.

Method 900 includes generating, using a processor, a similarity matrix or a co-occurrence matrix for a corpus of documents. Further, method 900 includes applying, using the processor, a clustering algorithm to the similarity matrix or the co-occurrence matrix to generate a graph corresponding to the corpus of documents. In addition, method 900 includes applying, using the processor, a community detection algorithm to the graph to detect a plurality of clusters of nodes of the graph, the plurality of clusters having a first modularity exceeding a minimum modularity threshold. Method 900 further includes for a first cluster of the plurality of clusters, iteratively removing, using the processor, a node of the first cluster to form a second cluster based on a pruning stop criterion. In some instances, a betweenness centrality of the node is a maximum of betweenness centralities of remaining nodes of the second cluster.

Method 900 further comprises applying, using the processor, the community detection algorithm to the second cluster to identify a plurality of third clusters of the second cluster, the plurality of third clusters having a second modularity exceeding the minimum modularity threshold. In such cases, method 900 further comprises presenting, using the processor, the plurality of third clusters as a taxon graph composed of taxon nodes each representing one of the plurality of third clusters. In addition, method 900 further includes computing, using the processor, a centroid of the one of the plurality of third clusters; and identifying, using the processor, a representation of the taxon node representing the one of the plurality of third clusters based on proximity of the centroid to nodes of the one of the plurality of third clusters.

Method 900 further comprises receiving, at the processor, a first document for labeling. In such cases, method 900 further comprises defining, using the processor, a first probability distribution associated with the input document and second probability distributions associated with the taxon nodes. Then, method 900 comprises extracting a label from the taxon nodes for labeling the first document based on a statistical distance between the first probability distribution and the second probability distributions. For example, the statistical distance can be a Kullback-Leibler (KL) divergence or a Jensen-Shannon (JS) divergence.

In various embodiments, the clustering algorithm recited in method 900 includes a probabilistic latent semantic analysis (pLSA), a latent Dirichlet allocation (LDA), a multilayer graph clustering algorithm, or a combination thereof. Further, the community detection algorithm includes a random-walk based algorithm formulated to compute the first modularity. In some instances, the plurality of clusters correspond to one of a sequence of hierarchical partitions of the nodes of the graph identified by the random walk-based algorithm; and the first modularity is a maximum of modularity scores of the sequence of hierarchical partitions of the nodes of the graph.

In some instances, the first modularity is computed based on Girvan-Newman algorithm. In such cases, the plurality of clusters correspond to one of a sequence of hierarchical partitions of the nodes of the graph identified by the Girvan-Newman algorithm; and the first modularity is a maximum of modularity scores of the sequence of hierarchical partitions of the nodes of the graph.

In various embodiments, the pruning stop criterion includes a size of the second cluster attaining a resolution limit of the second cluster, and in such cases, the iteratively removing includes iteratively removing the node of the first cluster to form the second cluster when the size of the second cluster attains a resolution limit of the second cluster. In various embodiments, the pruning stop criterion includes the second cluster being a fully connected graph, and in such cases, the iteratively removing includes iteratively removing the node of the first cluster to form the second cluster when the second cluster becomes a fully connected graph.

In various embodiments, the pruning stop criterion includes a size of the second cluster equaling two nodes, and in such cases, the iteratively removing includes iteratively removing the node of the first cluster to form the second cluster when the size of the second cluster equals two nodes. In various embodiments, the pruning stop criterion includes a betweenness centrality of the node is a maximum of betweenness centralities of remaining nodes of the second cluster, and in such cases, the iteratively removing includes iteratively removing the node of the first cluster to form the second cluster when the betweenness centrality of the node is the maximum of betweenness centralities of remaining nodes of the second cluster.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-9 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

The invention claimed is:

1. A method, comprising:
   generating, using a processor, a similarity matrix or a co-occurrence matrix for a corpus of documents;
   applying, using the processor, a clustering algorithm to the similarity matrix or the cooccurrence matrix to generate a graph corresponding to the corpus of documents;
   applying, using the processor, a community detection algorithm to the graph to detect a plurality of clusters of nodes of the graph, wherein at each of a plurality of hierarchy levels, each detected cluster has a respective modularity score exceeding a corresponding minimum modularity threshold;
   transforming, using the processor, a first cluster of the plurality of clusters into a second cluster by iteratively (i) determining betweenness centrality scores for nodes of the first cluster, and (ii) removing a node of the first cluster, the node of the first cluster having a betweenness centrality score that is a maximum of betweenness centrality scores of remaining nodes in the first cluster, until (iii) a pruning stop criterion is satisfied;
   applying, using the processor, the community detection algorithm to the second cluster to identify a plurality of third clusters of the second cluster, the plurality of third clusters having a second modularity score exceeding the minimum modularity threshold;
   presenting, using the processor, the plurality of third clusters as a taxon graph composed of taxon nodes each representing one of the plurality of third clusters;
   computing, using the processor, a centroid of the one of the plurality of third clusters; and
   identifying, using the processor, a representation of the taxon node representing the one of the plurality of third clusters based on proximity of the centroid to nodes of the one of the plurality of third clusters.

2. The method of claim 1, wherein the clustering algorithm includes a probabilistic latent semantic analysis (pLSA), a latent Dirichlet allocation (LDA), a multilayer graph clustering algorithm, or a combination thereof.

3. The method of claim 1, wherein the community detection algorithm includes a random walk-based algorithm formulated to compute the first modularity score.

4. The method of claim 3, wherein: the plurality of clusters correspond to one of a sequence of hierarchical partitions of the nodes of the graph identified by the random walk-based algorithm; and the first modularity score is a maximum of modularity scores of the sequence of hierarchical partitions of the nodes of the graph.

5. The method of claim 1, wherein the first modularity score is computed based on Girvan-Newman algorithm.

6. The method of claim 5, wherein: the plurality of clusters correspond to one of a sequence of hierarchical partitions of the nodes of the graph identified by the Girvan-Newman algorithm; and the first modularity score is a maximum of modularity scores of the sequence of hierarchical partitions of the nodes of the graph.

7. The method of claim 1, wherein: the pruning stop criterion includes a size of the second cluster attaining a resolution limit of the second cluster; and the iteratively removing includes ceasing to iteratively remove the node of the first cluster when the size of the second cluster attains a resolution limit of the second cluster.

8. The method of claim 1, wherein the betweenness centrality score associated with the node represents an amount the node connects to other nodes of the graph.

9. The method of claim 1, wherein the betweenness centrality score associated with the node is based on a percentage of shortest paths between nodes of the graph that pass through the node.

10. A system, comprising:
    a processor; and a memory device coupled to the processor and including instructions that, when executed by the processor, configure the processor to perform operations comprising:
    generating a similarity matrix or a co-occurrence matrix for a corpus of documents;
    applying a clustering algorithm to the similarity matrix or the co-occurrence matrix to generate a graph corresponding to the corpus of documents;
    applying, using the processor, a community detection algorithm to the graph to detect a plurality of clusters of nodes of the graph, wherein at each of a plurality of hierarchy levels, each detected cluster has a respective modularity score exceeding a corresponding minimum modularity threshold;
    transforming, using the processor, a first cluster of the plurality of clusters into a second cluster by iteratively (i) determining betweenness centrality scores for nodes of the first cluster, and (ii) removing a node of the first cluster, the node of the first cluster having a betweenness centrality score that is a maximum of betweenness centrality scores of remaining nodes in the first cluster, until (iii) a pruning stop criterion is satisfied;
    applying, using the processor, the community detection algorithm to the second cluster to identify a plurality of third clusters of the second cluster, the plurality of third clusters having a second modularity score exceeding the minimum modularity threshold;
    presenting, using the processor, the plurality of third clusters as a taxon graph composed of taxon nodes each representing one of the plurality of third clusters;
    computing, using the processor, a centroid of the one of the plurality of third clusters; and identifying, using the processor, a representation of the taxon node representing the one of the plurality of third clusters based on proximity of the centroid to nodes of the one of the plurality of third clusters.

11. The system of claim 10, wherein the operations further comprise: applying the community detection algorithm to the second cluster to identify a plurality of third clusters of the second cluster, the plurality of third clusters having a second modularity score exceeding the minimum modularity threshold.

12. The system of claim 11, wherein the operations further comprise: presenting the plurality of third clusters as a taxon graph composed of taxon nodes each representing one of the plurality of third clusters.

13. The system of claim 10, wherein: the pruning stop criterion includes a size of the second cluster attaining a resolution limit of the second cluster; and the iteratively removing includes ceasing to iteratively remove the node of the first cluster when the size of the second cluster attains a resolution limit of the second cluster.

14. A non-transitory computer-readable medium (CRM) in which a program is stored for causing a computer to perform operations comprising:

generating a similarity matrix or a co-occurrence matrix for a corpus of documents;

applying a clustering algorithm to the similarity matrix or the co-occurrence matrix to generate a graph corresponding to the corpus of documents;

applying, using the processor, a community detection algorithm to the graph to detect a plurality of clusters of nodes of the graph, wherein at each of a plurality of hierarchy levels, each detected cluster has a respective modularity score exceeding a corresponding minimum modularity threshold;

transforming, using the processor, a first cluster of the plurality of clusters into a second cluster by iteratively (i) determining betweenness centrality scores for nodes of the first cluster, and (ii) removing a node of the first cluster, the node of the first cluster having a betweenness centrality score that is a maximum of betweenness centrality scores of remaining nodes in the first cluster, until (iii) a pruning stop criterion is satisfied;

applying, using the processor, the community detection algorithm to the second cluster to identify a plurality of third clusters of the second cluster, the plurality of third clusters having a second modularity score exceeding the minimum modularity threshold;

presenting, using the processor, the plurality of third clusters as a taxon graph composed of taxon nodes each representing one of the plurality of third clusters;

computing, using the processor, a centroid of the one of the plurality of third clusters; and identifying, using the processor, a representation of the taxon node representing the one of the plurality of third clusters based on proximity of the centroid to nodes of the one of the plurality of third clusters.

15. The non-transitory CRM of claim 14, wherein the operations further comprise: applying the community detection algorithm to the second cluster to identify a plurality of third clusters of the second cluster, the plurality of third clusters having a second modularity score exceeding the minimum modularity threshold.

16. The non-transitory CRM of claim 15, wherein the operations further comprise: presenting the plurality of third clusters as a taxon graph composed of taxon nodes each representing one of the plurality of third clusters.

17. The non-transitory CRM of claim 14, wherein: the pruning stop criterion includes a size of the second cluster attaining a resolution limit of the second cluster; and the iteratively removing includes ceasing to iteratively remove the node of the first cluster when the size of the second cluster attains a resolution limit of the second cluster.

* * * * *